Jan. 8, 1963     F. T. JOHMANN     3,072,102
MECHANICAL PENCIL

Filed April 24, 1957     3 Sheets-Sheet 1

INVENTOR.
Frank T. Johmann

Jan. 8, 1963    F. T. JOHMANN    3,072,102
MECHANICAL PENCIL
Filed April 24, 1957    3 Sheets-Sheet 2

INVENTOR.
Frank T. Johmann

Jan. 8, 1963  F. T. JOHMANN  3,072,102
MECHANICAL PENCIL

Filed April 24, 1957  3 Sheets-Sheet 3

INVENTOR.
Frank T. Johmann

United States Patent Office 3,072,102
Patented Jan. 8, 1963

3,072,102
MECHANICAL PENCIL
Frank T. Johmann, 49 Hampton Drive,
Berkeley Heights, N.J.
Filed Apr. 24, 1957, Ser. No. 654,927
14 Claims. (Cl. 120—17)

This invention relates to mechanical pencils. Particularly, it relates to mechanical pencils in which the writing lead may be advanced step-by-step upon actuating pushbutton means, or by pressing the tip end of the pencil downward against a rigid surface.

In my pencil, the lead may be advanced by means of a lead follower operating in a helical guide. The lead follower may be rotated relative to its helical guide and thereby advanced by means actuated by a pushbutton or by pressing the writing tip of the pencil against a rigid surface by exerting a downward force on the pencil parallel to its longitudinal axis. The lead follower may also be either advanced or retracted in a more conventional manner by rotating the tip portion of the pencil relative to its main barrel.

The invention will be further understood by the following description and the accompanying drawings which include preferred embodiments of my invention.

Figure 1:
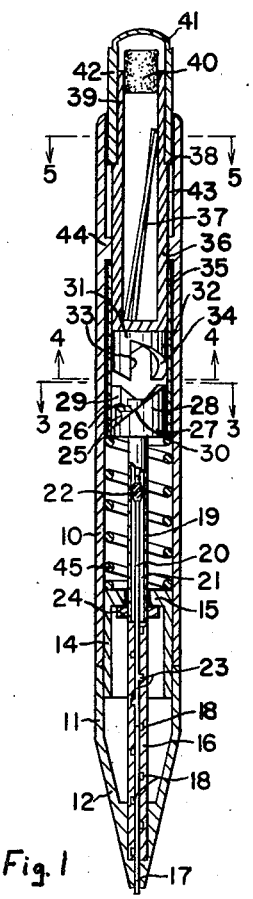
FIGURE 1 is a longitudinal sectional view of a mechanical pencil of my invention having pushbutton actuated means for advancing the lead.
Figure 2:
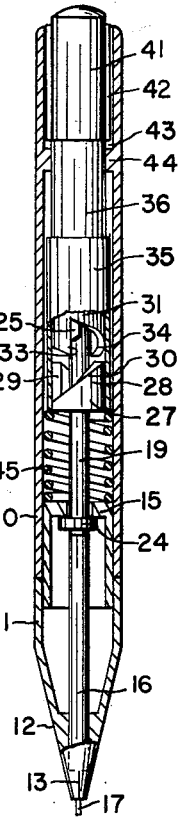
FIGURE 2 is a longitudinal sectional view of the pencil of FIGURE 1 in which the moving parts of the lead propelling mechanism are shown in an intermediate position which they assume during each inward movement of the pushbutton and prior to the return movement of the pushbutton.
Figure 6:
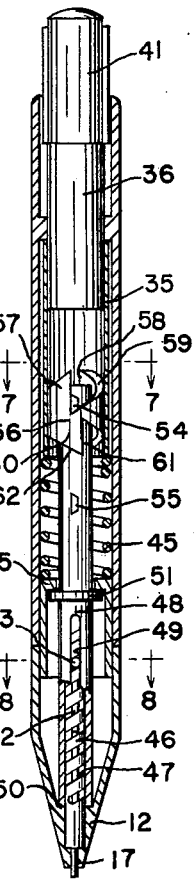
FIGURE 6 is a longitudinal sectional view of another pushbutton operated mechanical pencil illustrating another embodiment of my invention.
Figure 3:
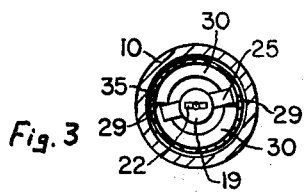
FIGURE 3 is a cross-sectional view taken along the line 3—3 of FIGURE 1.
Figure 7:
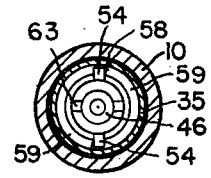
FIGURE 7 is a cross-sectional view taken along the line 7—7 of FIGURE 6.
Figure 8:
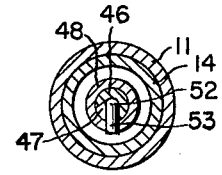
FIGURE 8 is a cross-sectional view taken along the line 8—8 of FIGURE 6.
Figure 9:
FIGURE 9 is an enlarged side view of the lead follower utilized in the embodiment of FIGURE 6.
Figure 4:
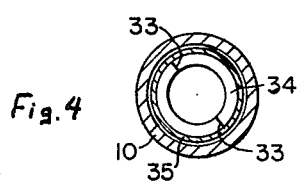
FIGURE 4 is a cross-sectional view taken along the line 4—4 of FIGURE 1.
Figure 5:
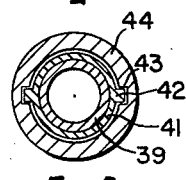
FIGURE 5 is a cross-sectional view taken along the line 5—5 of FIGURE 1.

Referring to the drawings in detail and particularly to the embodiment shown in FIGURES 1 to 5, the pencil has an outer casing comprising an upper hollow barrel portion 10 and a lower barrel portion 11. The barrel portion 11 is tapered inwardly near its outer end to form the conical portion 12, which may have the conventional slits 13 at its tip. The lower portion of the tubular sleeve 14 is fixed within the barrel portion 11, while the upper portion of said sleeve 14 extends into and frictionally engages the barrel portion 10, thereby joining said barrel portions 10 and 11 so that they may be rotated relative to each other. An inwardly projecting annular lip 15 is formed at the upper end of the sleeve 14 for a purpose to be later described. The lower portion of the lead guide tube 16 is fixed within the lower conical portion 12. The tubular lead guide tube 16, carries a lead 17, and is formed internally with the helical guide or thread 18. Seated upon and rotatable on the upper end of the lead guide tube 18 is the lead follower guide tube 19. The follower guide 19 is formed with a longitudnial bore for receiving the follower shaft 20, and longitudinal slots 21 connecting with said bore, said slots thereby providing a guide-way for the upper flattened portion 22 of the follower. The lower portion of the follower shaft 20 extends into the bore of the lead guide tube 16, and is formed with the projecting lugs 23 which engage the helical thread 18. The follower therefore rotates with the follower guide tube 19, and is longitudinally movable within the lead guide 16 and the follower guide tube 19 upon relative rotation of said guides 16 and 19. Fixed to the lower portion of the follower guide tube 19 is the collar 24, which collar bears against the underside of the lip 15, thereby preventing vertical movement of the follower guide tube. The upper portion of the follower guide 19 extends through the tubular member 27, and is formed with outwardly projecting members or ears 25 whose upper and lower edges may be tapered as at 26. The member 27 is tubular and its upper rim is notched to form the upwardly projecting and radially spaced teeth 28, which teeth each have a vertical edge 29 and a tapered edge 30. Spaced upwardly from said member 27, is a second member 31 which is formed in a manner similar to that of the member 27, except that its teeth 32 project downwardly and are radially or circumferentially offset to the teeth 28 of the member 27, i.e. the vertical edge 33 of the upper teeth 32 are directly above the tapered edge 30 of the lower teeth 28, while the tapered edge 34 of the upper teeth are above the vertical edge 29 of the lower teeth. The spaced members 27 and 31 are fixed within the tubular sleeve 35. The tubular sleeve 35 in turn, fits over and fixedly engages, the lower portion of the tubular lead container 36, which may contain spare leads 37. The upper portion of the outer wall of the container 36 is inset to form the annular lip 38, and the reduced cross-section portion 39 of the container, which normally projects through the open top of the barrel 10, carries the tubular eraser 40. A removable tubular cap 41, closed at its upper end, slips over and frictionally engages the upper portion 39 of the container 36, seating against the lip 38. The cap 41 is formed with outwardly projecting longitudinal flanges 42 which guide the cap in slots 43 provided in the upper portion of the barrel 10 which is reduced in internal diameter to form the thickened wall 44. A compression coil spring 45 surrounding an intermediate portion of the guide tube 19, seats at its lower end against the top of the annular lip 15, while its upper end seats against the bottom of the sleeve 35. Said spring 45 thereby normally urges said sleeve 35 upwardly relative to the barrel, so that the upper edge of said sleeve normally seats against the underside of the thickened wall portion 44 of the barrel 10.

In operation, the cap 41 which serves as a pushbuttton is depressed to thereby force the lead container 36, its connecting sleeve 35, and the members 27 and 31 fixed within said sleeve, downwardly into the barrel against the action of the spring 45. During this downward movement the member 27 drops from under the ears 25 of the follower guide 19, while the tapered edge 34 of the teeth 32 of the member 31 now comes into contact with the upper edge of the ears 25. As the member 31 continues downwardly, the ears 25 then begin to slide along the tapered edges 34 until they come into contact with the vertical edges 33 of the teeth 32. It will then be apparent that the ears 25 and their attached follower guide tube 19 have been rotated in a clockwise direction (when viewed from the top) thereby advancing the lead follower and correspondingly further projecting the writing lead 17 out of the tip of the pencil. When pressure is released on the pushbutton 41, the spring 45 urges the sleeve 35 upwardly. The member 31 then begins to lift upwardly out of contact with the ears 25, while the tapered edges 30 of the teeth 28 of the member 27 now come into engagement wtih the lower edge of the ears 25. The ears 25 now begin to ride along the tapered edges 30 until they come into contact with the vertical edges 24 of the teeth 28. It is then apparent that on the return motion of the pushbutton, the ears 25 and the follower guide 19 are again partially rotated in a clockwise direction and the lead is even further advanced. During the just-described operation, the flanges 42 of the cap 41, are retained against rotation by the slots 43 in the top portion of the barrel. Also the frictional engagement of the upper barrel portion 10 with the lower barrel portion 11 is sufficiently great so that no relative rotation occurs between the barrel members 10 and 11. It will thus be apparent that during the above described operation that only the ears 25, the follower guide tube 19 and the follower shaft 20 are rotated. However, to retract the lead follower, so as to permit the insertion of a new lead into the lead guide tube 16, the upper barrel portion may be rotated counter-clockwise (when viewed from the top) while the lower barrel section 11 is held stationary. Then the ears 25, which bear against the vertical edges 29 of the lower tubular member 27, are also rotated counter-clockwise, thereby causing the lead follower to move upwardly relative to the lead guide tube 16 so that a new lead may be inserted into the guide tube 16.

FIGURES 6 to 9 illustrate another embodiment of my invention which is a variation of the embodiment shown in FIGURES 1 to 5. In this latter embodiment, the lead 17 is carried in a tubular lead guide member 46 which has been spirally wound to form the helical guide slot 47. The lower portion of said lead guide 46 is anchored in the tip portion 12 of the pencil. Surrounding and concentric with the lead guide 46 and rotatable relative thereto, is the sleeve 48 which is formed with a longitudinal slot 49 extending downwardly from a point intermediate the length of said sleeve through the lower end of the sleeve. The sleeve 48 is prevented from moving longitudinally as the lower end of said sleeve bears against the annular internal lip 50 formed in the tip 12, while a collar 51 fixed to the sleeve bears against the underside of the inwardly projecting annular lip 15. The shank 52 of a lead follower is carried within the bore of the lead guide 46, while its projecting lug 53 extends through the helical slot 47 and the slot 49 of the sleeve. It is thus apparent that the lead follower will move longitudinally within the lead guide tube 46 upon relative rotation of said guide tube 46 and said sleeve 48.

Two pairs of ears 54 and 55 extend outwardly from the upper portion of the sleeve 48, said ears being adapted to cooperate with the member 56 fixed with the sleeve 35. The member 56 is formed on its upper end with the upwardly projecting teeth 57, each of said teeth having a vertical edge 58, while the other side of each of said teeth is tapered as at 59. The lower side of the member 56 is formed with the downwardly projecting teeth 60, each of said teeth 60 being formed with a vertical edge 61 and a tapered edge 62. The teeth 57 are oppositely projecting and are radially offset from the teeth 60. Longitudinal slots 63, extending from the top of said sleeve 48 downward to a point opposite the teeth 55, may be formed in the sleeve 48, so that the upper portion of the sleeve 48 may be compressed together so that the sleeve and its outwardly projecting upper ears 54 may be inserted into and through the tubular member 56, so that upon release of the compressed portion of the sleeve, the upper ears 54 are now retained above the member 56 while the lower ears 55 are below said member 56. During operation of the mechanism, the cap 41 acts as a pushbutton so that when depressed the lead container 36, the sleeve 35 and the member 56 is moved downwardly relative to the sleeve 48. Upon this downward movement, the upper teeth 57 drop out from engagement with the upper ears 54, while the lower teeth 60 corresponding move into contact with the lower ears 55. Upon continuation of said downward movement the ears 55 are rotated, as they follow along the tapered edge 62 of the lower teeth 60, until they come into contact with the vertical edge 61 of the teeth 60. Then upon release of the pushbutton 41, the spring 45 returns the member 56 upward, so that the lower teeth 60 move out of engagement with the lower ears 55, while the tapered edges 59 of the upper teeth 57 now engages the upper ears 54 and partially rotates them. FIGURES 6 to 9 therefore represent an embodiment similar to that of FIGURES 1 to 5, except that the lead propelling mechanism has been modified. Still other variations are possible, for example the ears 54 and 55 of FIGURE 6 may be radially offset, while the oppositely projecting teeth 57 and 60 need not be radially offset, etc.

Figure 10:
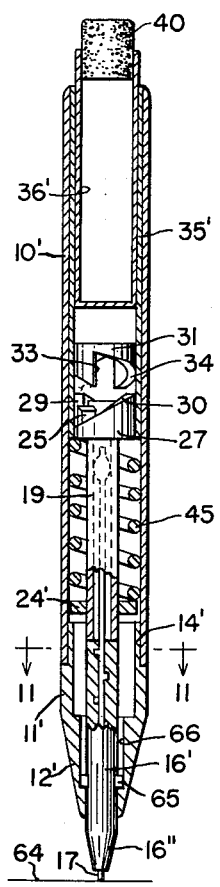
FIGURE 10 is a longitudinal sectional view of another embodiment of my invention wherein the lead may be advanced by pressing the tip of the pencil downward against a rigid surface.
Figure 12:
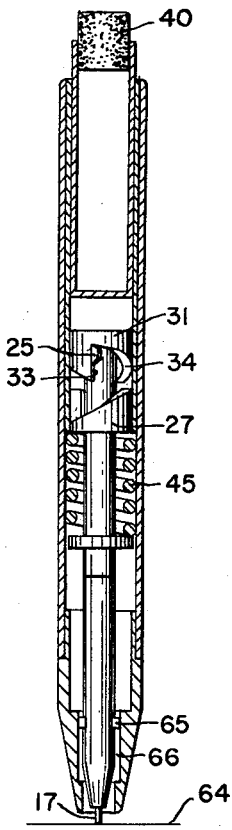
FIGURE 12 is a longitudinal sectional view of the embodiment of FIGURE 10 in which the moving parts of the lead propelling mechanism are shown in an intermediate position.
Figure 11:
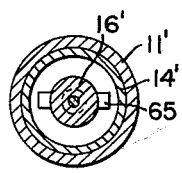
FIGURE 11 is a cross-sectional view taken along the line 11—11 of FIGURE 10.
Figure 14:
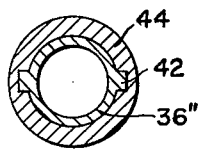
FIGURE 14 is a cross-sectional view taken along the line 14—14 of FIGURE 13.

FIGURES 10 to 12 illustrate another embodiment of my invention wherein the lead may be advanced by telescoping the tip portion of the pencil into the barrel. The main barrel portion 10' is frictionally engaged by the inset portion 14' of the lower barrel portion 11' which is tapered near its tip 12'. The conical tip 16" of the lead guide tube 16' projects through the open end of the conical portion 12'. The guide tube 16' is provided with outwardly projecting ears 65 which are longitudinally movable in the slots 66 formed in the conical portion 12'. The follower guide member 19, has the fixed collar 24' near its lower end while its upper end has the projecting ears 25 which coact with the members 27 and 31 which members are fixed within the sleeve 35'. The sleeve 35' is fixed to the barrel 10' while the tubular spare lead container 36' is fixed within the sleeve 35'. In operation, the pencil may be held vertical to a rigid surface 64, and then pressed downward to telescope the projecting portion of the lead guide tube into the barrel against the action of the spring 45, as shown in FIGURE 12. During this operation the follower guide 19 is partially rotated with respect to the lead guide tube 16', due to the ears 25 sliding along the tapered edges 34 of the member 31. When the pencil is lifted up from contact with the surface 64, the pencil will expand and the ears 25 will slide along the tapered edges 30 of the member 27, thereby again partially rotating the follower guide 19 relative to the lead guide tube 16' and advancing the lead 17. Since the pencil is pressed against the paper at an angle during normal writing use there is little or no tendency for the writing point to be forced upward against the action of the spring and into the barrel.

Figure 13:
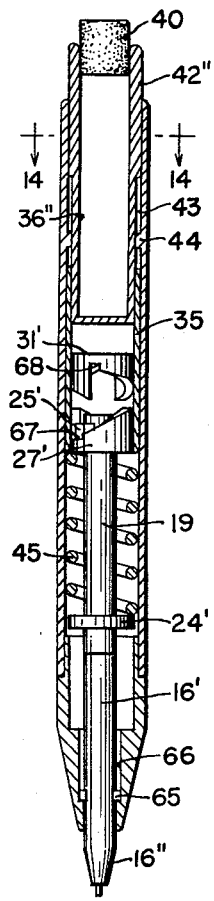
FIGURE 13 is a longitudinal sectional view of still another embodiment of my invention.

In FIGURE 13 is shown still another embodiment of my invention which may be actuated either by a pushbutton, i.e. by pushing downward on the eraser 40, or by pressing the tip portion of the pencil downwardly against a solid surface so that it will telescope into the barrel. This figure is similar to that of FIGURE 10, except that the sleeve member 35, and the members 31' and 27' fixed within said sleeve and the reservoir member 36" are all longitudinally movable. However, to prevent rotation of these members, the tubular reservoir 36″ may be formed with projecting flanges 42″ which are adapted to ride in corresponding slots formed in the thickened top portion 44 of the barrel. It will thus be apparent that upon pushing downward on the top of the pencil, or by pushing the tip end of the pencil downward against a solid surface, that in either case the ears 25′ will move longitudinally relative to the members 31′ and 27′ and thereby advance the lead. It will also be noted that the member 27′ may be formed with notches 67 adapted to receive the squared ears 25′ and to retain them against rotational movement. In this way the lead may be also advanced, as well as retracted by relative rotation of the main barrel and the tip portion.

Figure 15:
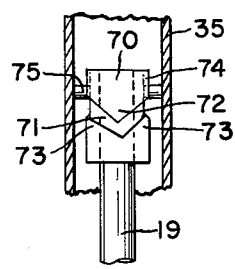
FIGURE 15 is a fragmentary view of another embodiment of my invention.
Figure 16:
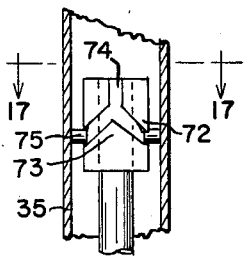
FIGURE 16 is a fragmentary view of the embodiment of FIGURE 15 in an intermediate position.
Figure 17:
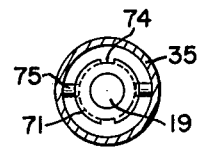
FIGURE 17 is a cross-sectional view taken along the line 17—17 of FIGURE 16.

FIGURES 15 to 17 illustrate an alternate mechanism for rotating the lead guide tube which might be used, for example, to replace the ears 25 and the members 27 and 31 of FIGURE 1. In this alternate mechanism, a sleeve 70 is fixed to the upper end of the follower guide tube 19. A groove 71 extends around the periphery of the sleeve 20 to form the downwardly projecting teeth 72 and the offset upwardly extending teeth 73. Opposed vertical grooves 74 extend downwardly from the top of the sleeve 70 and communicate with the groove 71. Two opposed and inwardly projecting pins 75 are fixed within the sleeve 35 and normally extend into the lower portion of the groove 74 as in FIGURE 15, since upward movement of the sleeve 35 is restricted. However, as the sleeve 35 moves downwardly relative to the sleeve 70 and follower guide 19, the pins 75 ride along the groove 71, thereby rotating the sleeve 70 clockwise (when viewed from the top) to the position shown in FIGURE 16. As the sleeve 35 and pins 75 move upwardly relative to the sleeve 70, the sleeve 70 is again rotated clockwise to the position shown in FIGURE 15. Thus the sleeve 70 and the follower guide 19 are rotated clockwise upon the relative longitudinal movement of the pins 75 and the sleeve 70. Since the pins 75 will normally extend into the vertical groove 74, then upon rotation of the sleeve 35, either clockwise or counter-clockwise, the sleeve 70 and its follower tube 19 will correspondingly be rotated.

Figure 18:
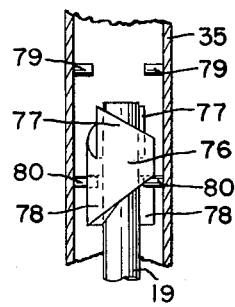
FIGURE 18 is a fragmentary view of yet another embodiment of my invention.

FIGURE 18 illustrates yet another alternate mechanism for rotating the follower guide tube, which might be used for example, to replace the ears 25 and the members 27 and 31 of FIGURE 1. In FIGURE 18, the tubular member 76 is fixed to the upper portion of the follower guide tube 19. The member 76 is formed with upwardly projecting teeth 77 and downwardly projecting teeth 78 which are offset from the teeth 77. Upper pins 79 and lower pins 80 project inwardly from the sleeve 35. Upon the relative longitudinal movement of the sleeve 35 and the member 76, the follower guide tube 19 will be rotated.

I claim:

1. A mechanical pencil comprising a barrel including an upper barrel portion and a lower barrel portion open at its writing end, a lead guide tube mounted within said barrel for longitudinal movement and normally projecting through the open writing end of said lower barrel portion, spring means disposed within said barrel and adapted to urge said lead guide tube to a position projecting through said open lower barrel portion, guide means for preventing the rotary movement of said lead guide tube relative to said lower barrel portion, a lead follower longitudinally movable within said lead guide tube, a helical guideway fixed against rotation relative to said lower barrel portion and engaging said lead follower, and a mechanism for causing rotation of said lead follower relative to said helical guideway whereby said lead follower is longitudinally moved within said lead guide tube, said mechanism comprising projecting means and toothed means, one of said projecting means and said toothed means being engaged with said lead follower and rotatable therewith, the other of said projecting means and said toothed means being fixed against rotation within the upper barrel portion, said toothed means including an upper set of teeth and a lower set of teeth, said projecting means including ears, one of said sets of teeth being adapted to engage and rotate said ears relative to said toothed means when said lead guide tube is forced inwardly against said spring pressure, the other of said sets of teeth being adapted to engage and rotate said ears relative to said toothed means when said lead guide is moved outwardly under the pressure of said spring.

2. A mechanical pencil according to claim 1, wherein said projecting means is engaged with said lead follower and said toothed means is fixed within the upper portion of said barrel.

3. A mechanical pencil according to claim 1, wherein said upper barrel portion is rotatable relative to said lower barrel portion.

4. A mechanical pencil having a longitudinal axis and a writing end comprising in combination:
   a barrel having an upper end and a lower end;
   a lead guide tube having an outer end and carried by said barrel for longitudinal movement relative to said barrel;
   a resilient element urging said lead guide tube to its normally extended position wherein said outer end of said lead guide tube extends outwardly past the lower end of said barrel;
   a lead follower member longitudinally movable within said lead guide tube;
   a helical guide member defining a helical guide having a pitch in engagement with said lead follower member, said lead guide tube, said lead follower member and said helical guide member being longitudinally movable together inwardly relative to said barrel upon pressing said writing end of said pencil downwardly against a rigid surface under axially directed pressure;
   and a mechanism for causing rotation of said lead follower member relative to said helical guide member whereby said lead follower member can be longitudinally advanced within said lead guide tube against said axially directed pressure, said mechanism including
   toothed means including a first tooth having two sides including a first tapered side and a second tooth having two sides including a second tapered side, said first tooth and said second tooth being longitudinally disposed, one above the other and
   projecting means;
   one of said means being engaged with one of said members and rotatable therewith, the other of said means being fixed against rotation relative to the adjacent part of said barrel,
   said first tapered side being adapted for sliding engagement with said projecting means to obtain a first rotary and a first longitudinal movement, while in said sliding engagement, of said toothed means relative to said projecting means when said lead guide tube is forced inwardly relative to said barrel against pressure of said resilient element upon said pressing, whereby said lead follower member is longitudinally advanced relative to said helical guide member against the pressure of said pressing, the slope of said first tapered side and the pitch of said helical guide being so proportioned that the longitudinal distance of said first longitudinal movement is greater than the longitudinal distance said lead follower member is advanced relative to said helical guide member; said second tapered side being adapted for sliding engagement with said projecting means to cause a second rotary and second longitudinal movement of said toothed means relative to said projecting means when said lead guide tube is moved outwardly relative to said barrel under the pressure of said resilient element upon cessation of said pressing, whereby said lead follower member is again longitudinally advanced relative to said helical guide member.

5. A mechanical pencil according to claim 4 wherein: said barrel includes an upper barrel portion and a lower barrel portion in frictional engagement, said lower barrel portion being rotatable relative to said upper barrel portion, said helical guide member is fixed against rotation relative to said lower barrel portion, one of said means engaging said lead follower member and being rotatable therewith, and the other of said means being fixed against rotation relative to said upper barrel portion.

6. A mechanical pencil according to claim 4, wherein said lead guide tube and said helical guide member comprise an identical element.

7. A mechanical pencil according to claim 4, wherein said toothed means comprise a first series of ratchet teeth in which each tooth has a vertical side and a tapered side, and a second series of ratchet teeth in which each tooth has a vertical side and a tapered side, said first tooth being one of said first series of teeth and said second tooth being one of said second series of teeth.

8. A mechanical pencil according to claim 4, wherein: said barrel includes relatively rotatable upper and lower barrel portions, said lead guide tube projects through said lower barrel portion, one of said members is conjointly rotatable with said lower barrel portion relative to said upper barrel portion, said other of said means being fixed against rotation relative to said upper barrel portion, said toothed means further defining a notch, said resilient element also urges said projecting means and said toothed means into abutting engagement within said notch, whereby said toothed means and said projecting means are conjointly rotatable with said upper barrel portion relation to said lower barrel portion to advance said lead follower member relative to said helical guide member upon rotating one of said barrel portions relative to the other of said barrel portions.

9. A mechanical pencil according to claim 4, wherein said projecting means is engageable with said lead follower member and rotatable therewith.

10. A mechanical pencil according to claim 4, wherein said toothed means comprises a sleeve formed with a groove extending around its periphery to define said upper tooth and said lower tooth.

11. A mechanical pencil according to claim 4, wherein said toothed means is a sleeve fixed against rotation relative to the adjacent part of said barrel and having ends defining said first tooth and said second tooth, and said projecting means are longitudinally spaced upper and lower ears engageable and rotatable with said lead follower member.

12. A mechanical pencil according to claim 4, wherein said projecting means comprise longitudinally spaced upper and lower ears fixed against rotation relative to the adjacent part of said barrel, and said toothed means is a sleeve having ends defining said first tooth and said second tooth engageable with said lead follower member and rotatable therewith.

13. A mechanical pencil according to claim 4, wherein both of said means are longitudinally movable relative to each other and relative to said barrel.

14. A mechanical pencil according to claim 13, wherein said means fixed against rotation relative to the adjacent part of said barrel is defined by a sleeve having an upper end projecting through the upper end of said barrel to serve as a pushbutton, said sleeve being longitudinally movable relative to the upper end of said barrel upon depressing and releasing said pushbutton, but fixed against rotation relative to said upper end of said barrel.

References Cited in the file of this patent

UNITED STATES PATENTS

| 387,042 | Bohren | July 31, 1888 |
| 1,719,976 | Grimmer | July 9, 1929 |
| 2,452,907 | Collura | Nov. 2, 1948 |
| 2,646,775 | Vierling | July 28, 1953 |

FOREIGN PATENTS

| 1,121,530 | France | May 7, 1956 |